Nov. 7, 1939.   R. L. COULTRIP   2,179,281
CONTROL DEVICE
Filed July 6, 1938
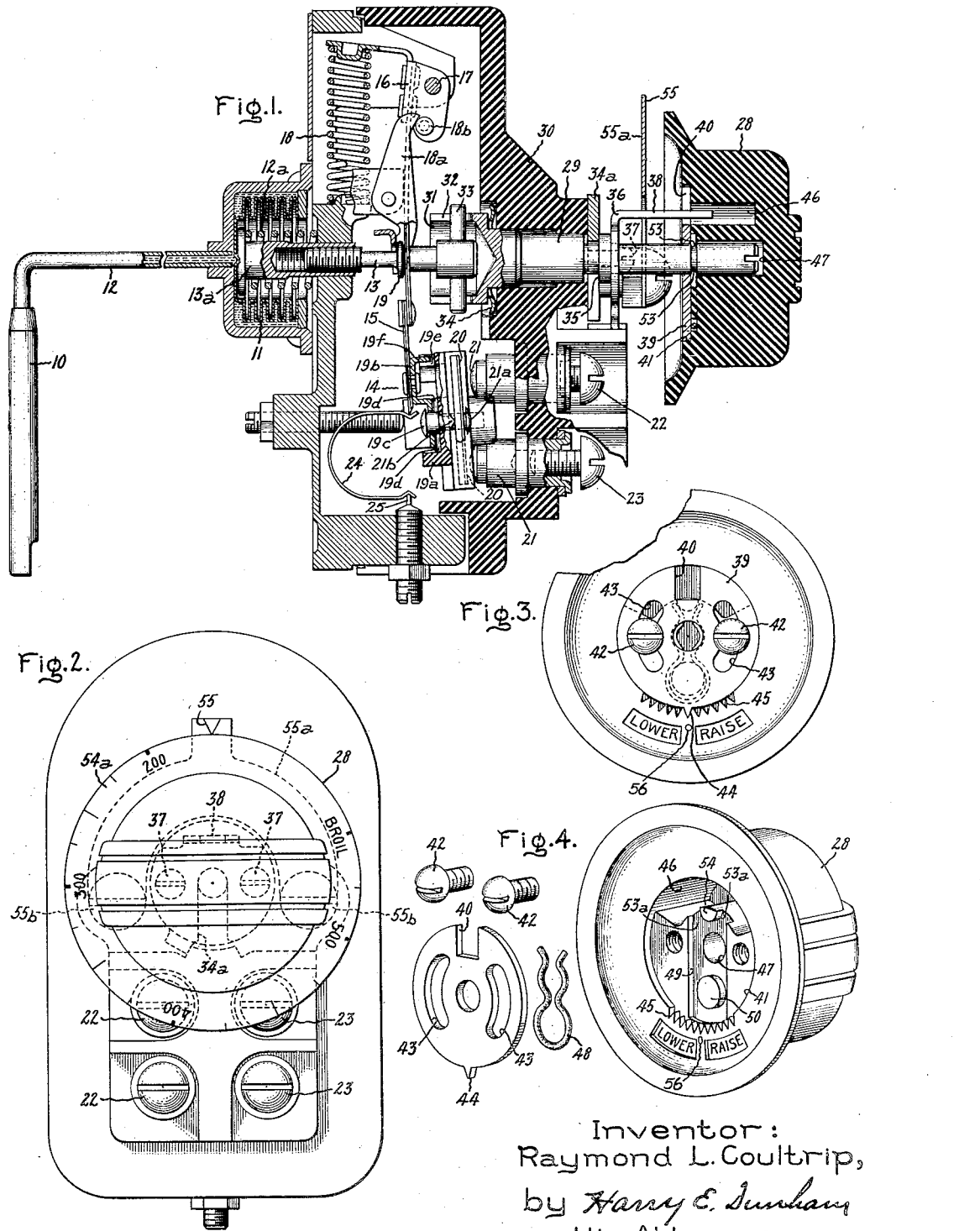
Inventor:
Raymond L. Coultrip,
by Harry E. Dunham
His Attorney.

Patented Nov. 7, 1939

2,179,281

UNITED STATES PATENT OFFICE 2,179,281

CONTROL DEVICE

Raymond L. Coultrip, Waukegan, Ill., assignor to Edison General Electric Appliance Company, Incorporated, Chicago, Ill., a corporation of New York Application July 6, 1938, Serial No. 217,700

10 Claims. (Cl. 200—83)

This invention relates to control devices, more particularly to control devices for electric appliances and the like, such as thermostats, switches, etc., and it has for its object the provision of an improved device of this character.

More specifically, this invention relates to control devices which are provided with an operating member, such as a knob, whereby the device can be adjusted to perform its controlling functions, and it contemplates the provision in a device of this character of improved means for effecting an adjustment between the control knob and the controlling device in order to set the device to the characteristics of the controlled appliance.

For a more complete understanding of this invention, reference should be had to the accompanying drawing in which Fig. 1 is a side elevation, mainly in section, illustrating a temperature control device arranged in accordance with this invention; Fig. 2 is a front elevation of the control device of Fig. 1; Fig. 3 is an enlarged fragmentary view in rear elevation of the control knob of the temperature responsive device of Figs. 1 and 2; and Fig. 4 is an expanded perspective view illustrating certain elements of this invention.

Referring to the drawing, this invention has been shown in one form as applied to a temperature control device arranged substantially in accordance with the temperature control device described in the U. S. patent to Nicholas Miller and Russell A. Winborne, No. 2,110,674, dated March 8, 1938. As shown, this control device comprises a bulb and bellows temperature responsive system having a bulb 10 adapted to be located in the heated zone, such as an electric oven, and connected into a closed fluid system with a bellows assembly 11 by means of a tube 12. The bulb 10, the chamber around the bellows 11 and the tube 12 are filled with a suitable thermally responsive liquid so that when the temperature at the bulb 10 increases the liquid expands to cause the bellows 11 to contract, and when the temperature at the bulb 10 is reduced the liquid contracts to permit the bellows to expand. The contraction of the bellows is resisted by a loading spring 12a. The bellows is connected to a rod 13 to move the rod axially as the bellows expands and contracts. As shown, the rod 13 is threaded into a stud 13a secured to the bellows.

The movement of the rod is utilized to operate a switch mechanism 14 having a switch arm 15 that is rigidly secured at one end, its upper end, as viewed in Fig. 1, to a support 16 that is pivoted on a shaft 17. The support 16, and hence, its switch arm 15 are biased to move in a clockwise direction, as viewed in Fig. 1, by means of a compression spring 18. This movement is resisted by means of a lever 18a having one end bearing on a pin 18b on the support 16 and its other end bearing on an abutment 19 on the rod 13. Hence, the position of the switch arm 15 is controlled by the movement of the rod 13.

The free end of the switch arm 15 carries a contact support 19a formed of any suitable electrically insulating material, such as a phenol condensation product. The support 19a is attached to the switch arm by means of a bracket 19b which is riveted to the arm, as shown. The support 19a is attached to the bracket by means of a shoulder head drive screw 19c. As shown, a small clearance is provided between the head of this screw and the bracket 19b so that the support can move laterally or rock on V-shaped abutments 19d provided on the support and which engage the adjacent surface of the bracket 19b. In order to prevent twisting or turning of the support 19a, a slot 19e is provided in the support to receive a tongue 19f on the bracket 19b.

The support 19a carries a pair of spaced contacts 20, each of which cooperates with a pair of spaced fixed contacts 21. The contacts 20 are secured to the support 19a by means of shoulder head drive screws 21a. A small clearance is provided between the heads of these screws and the contacts to permit the contacts to rock on V-shaped abutments 21b on the support 19a.

The foregoing construction provides a pair of contacts that cooperate with two pairs of poles of a double pole switch, the contacts being movable in two directions to accommodate small variations in the positions of the four fixed contacts.

The contacts 21 are provided with binding screws 22 and 23 respectively whereby the contacts can be connected in the controlled circuit. It will be understood that they are connected so that there are two contacts in each line of the controlled circuit. It is to be understood that this controlled circuit may be the energizing circuit for the heating elements of the appliance being controlled, or a controlling circuit for this energizing circuit.

Bearing on the free end of the arm 15 is a snap-acting spring 24, having one leg, as shown, bearing on the free end of the arm and its other end bearing on a fixed pivot bearing 25.

In the operation of the control device thus far described, it will be understood that when the temperature at the bulb 10 increases the rod 13 is moved inwardly, which operation causes the switch arm 15 to move in a switch-opening direction due to the fact that the abutment 19 is moved inwardly away from the operating lever 18a, thereby permitting the spring 18 to move the support 16 and switch arm in this direction. This movement of the switch arm is opposed by the over-center compression spring 24 until the temperature at the bulb 10 has increased to a predetermined maximum at which the abutment 19 will have been moved inwardly sufficiently to permit the compression spring 18 to overcome the resistance of the spring 24, thereby causing the switch to snap to its open position. Conversely, as the temperature at the bulb 10 decreases the bellows expands to permit the rod 13 to move outwardly. This operation moves the operating lever 18a in a clockwise direction and, therefore, the switch arm support 16 in a counter-clockwise direction. Movement of the switch arm in this direction is opposed by the spring 24 until at a predetermined minimum temperature, the abutment 19 will have been moved outwardly sufficiently far to have positively forced the switch arm 15 to such a position that it will snap to reclose the contacts 21. In this manner, the control device will hold a substantially constant temperature at the bulb 10 between the maximum and minimum temperatures at which the switch opens and closes.

Temperature adjustment of the control device is effected by controlling the position of the abutment 19, and this is accomplished by turning the shaft 13 inwardly or outwardly relative to the bellows. This is done by an adjusting knob 28 secured to a shaft 29 mounted in an insulating cover 30 of the control device. This shaft at its inner end is directly connected to the shaft 13. As shown, the shaft 13 projects into a cup-like member 31 on the end of shaft 29, and this has slots 32 in its walls that receive a key pin 33. Interposed between the cup and cover is a compression spring 34 biasing the shaft 29 inwardly, that is, toward the left as viewed in Fig. 1. Movement of the shaft inwardly is opposed by means of a U-shaped plate 34a interposed between a collar 35 on the shaft, and the outer surface of the cover 30, as shown.

An operating plate 36 is interposed between the shaft 29 and the operating knob 28; this plate is arranged in the form of a disc which is secured to the collar by plate 34a by means of a pair of screws 37 so as to clamp tightly the collar 35 between them, and thereby effect a driving connection between the member 36 and the shaft. The plate 36 is provided at one edge with an outwardly extending lug 38 arranged generally at right angles to the plate 36, and which has a driving connection with an adjustment plate 39 mounted on the knob 28. As shown, the plate 39 is of circular form, and has a notch 40 that receives the lug 38 to effect a driving connection between the knob and the plate 36.

The adjustment plate 39 is fitted into a circular recess 41 in the knob, and is secured to the knob by a pair of screws 42 positioned on opposite sides of the axes of the plate and knob, as clearly shown in Figs. 3 and 4. These screws are directed through arcuate-shaped slots 43 in the plate 39 so that the plate can be adjusted angularly with reference to the knob. The plate 39 is provided at one edge with a tooth 44, which preferably will be and as shown is positioned substantially directly opposite the notch 40. The tooth 44 is adapted to be received in any one of a series of notches 45 arranged in the knob at the edge of the recess 41, as clearly shown in Figs. 3 and 4.

Arranged within the knob and below the circular recess 41 is an elongated well 46 which is positioned opposite the series of notches 45. This well receives the lug 38 that extends through the notch 40 of the plate 39. And it also provides means whereby the plate 39 can be conveniently shifted from one of the notches 45 to another to effect an adjustment between the knob 28 and the plate 36 without completely detaching the plate 39 from the knob. To effect this adjustment the screws 42 are turned out to loosen the plate 39 so that the part of the plate 39 which lies over the well 46 may be depressed into the well and thereby elevate the opposite side of the plate to remove the tooth 44 from the notch in which it is in. The plate 39 may then be shifted axially to the desired position, whereupon it may be dropped so that the tooth 44 falls into the notch corresponding to this position. The screws 42 may then be turned inwardly to tighten the plate 39 in its recess 41. It will be observed that the well 46 has a length substantially equal to that of the section of notches 45 so that it will receive the lug 38 at all positions of the plate 39 within its range of adjustment.

The knob 28 is further provided with a relatively deep recess 47 at its center and into which the shaft 29 extends. The knob is secured against axial movement from the shaft by means of a spring member 48 which is roughly in the shape of a U, as shown in Figs. 3 and 4. This spring member lies within a transverse recess 49, and the nexus of the spring, as shown, is looped around a circular abutment 50 extending upwardly from the bottom of the recess 49 to the level of the bottom wall of the recess 41. The legs of the spring 48, as shown, are squeezed in toward each other to define the loop that encircles the abutment 50. They flare outwardly from the loop and finally turn inwardly again to define a second looped section which is received in a recesss 53 (Fig. 1) provided for it in the end section of the shaft 29. The extreme ends of the legs of the spring flare outwardly from the second looped section and are received in channelways 53a that are defined by an upwardly extending semi-circular protuberance 54 in the recess 49, as clearly shown in Figs. 3 and 4. When the knob is moved inwardly on the shaft 29 the second loop section springs into the recess 53 in the shaft to resiliently hold the knob to the shaft. The spring 48 is sufficiently yielding, however, to permit the knob 28 to be withdrawn manually. It will be observed that the spring 48 is secured in its position in the recess 49 by means of the adjustment plate 39.

It will be observed in view of the foregoing construction that when the knob 28 is applied to the shaft, as shown in Fig. 1, it has a driving connection with the shaft through the member 36, 38 so that the position of the shaft and therefore of the abutment 19 can be changed to change the temperature setting of the device. Preferably, the knob will be provided with a temperature indicating scale 54a, as shown in Fig. 2, which cooperates with a fixed index 55 mounted at the front of the temperature control device; when the knob is turned in a clockwise direction, as viewed in Fig. 2, it elevates the temperature setting by moving the shaft 13 inwardly toward the bellows. This moves the abutment 19 inwardly, and hence a greater movement of the bellows is required to cause the switch to open than before, and a higher temperature is attained at bulb 10 before the switch is opened. Conversely, when the knob 28 is moved in a counter-clockwise direction, it reduces the temperature setting by moving the shaft and abutment outwardly with reference to the bellows. The index 55, as shown, is mounted on an inverted U-shaped support 55a, the legs of which are attached to the oven 30 by means fo a pair of screws 55b.

It will be understood that the temperature control device will be calibrated to the device to be controlled so that when the knob 28 is moved to indicate a temperature opposite the index 55, substantially this temperature will be held in the controlled appliance. For example, if the device is to be used to control the temperature in an electric range oven, the control device will be so calibrated that the oven temperature will correspond substantially to that shown on the scale 54a. However, due to the different types of heating appliances encountered and the variables involved, it is frequently found necessary to change the temperature setting of the control device both in the factory and in the field of use, and this must be done without disturbing the initial calibration of the thermostat. This may be readily done in the manner previously described by pulling the knob 28 from its shaft; and adjusting the tooth 44 to the desired position by loosening the screws 42, tilting the plate 39 to remove the tooth from its particular notch in which it is in and to permit axial movement of the plate to the desired position, at which it is dropped to cause the tooth to fall into the corresponding notch. This will change the position of the knob with reference to the shaft 29, and, therefore, will change the position of the temperature scale with reference to the fixed index 55 so that when a particular temperature setting is made by the knob that same temperature will be obtained in the appliance. And this is done without changing the initial calibration of the thermostat, that is, without changing the initial position of the shaft 29 with reference to the bellows, because the adjustment p'ate 39 must always have the same position with reference to the shaft; in other words, because the plate 39 can only be placed on the shaft so that the member 38 is received in the notch 40.

The width of each notch is such that it bears a definite relation to the dial scale 54a. In the particular embodiment of the invention shown, each notch corresponds to 10°. If desired, and it is preferable to do so, the knob may be provided with the words "Lower" and "Raise", as shown, to assist in making the adjustment of the knob with reference to its plate 39. Moreover, a round dot 56 may be placed below the central notch for positioning the tooth 44 on initial calibration. This dot serves as a reference point when making an adjustment.

It will be understood that while I have shown this invention as applied to a temperature control device of the bulb and bellows type, such as described and claimed in the above-mentioned application of Miller and Winborne, it is not limited to temperature control devices of this character. Nor is it limited to temperature control devices, but may be used in other control devices, such as a switch where it is desired to adjust the position of the knob with reference to the operating member of the switch.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A control device comprising a control member, an operating member for said control member, an adjustment member on one of said members arranged to be fitted in fixed relation with the other member and also to be fitted in fixed interlocking relation with said one member in each of a series of adjusted positions, and means for securing said adjustment member to said one member to hold it in any one of said positions and arranged to release it so that while it is attached to said one member it can be tilted out of one of said positions and shifted to and moved into any other of said positions.

2. A control device comprising a control shaft, an operating knob for said shaft, an adjustment plate on said knob arranged to have a driving connection with said shaft, and also having a tooth arranged to be fitted into any one of a series of notches in said knob, fastening means securing said adjustment plate to said knob and providing for its release for movement from one to any of the others of said positions, and means providing for tilting movement of said plate on said knob when it is released so that it can be tilted out of one of said notches, moved to another position and dropped into its notch corresponding to said position.

3. A control device comprising a control shaft, an operating knob for said shaft, an adjustment plate on said knob on one side a tooth adapted to be received in any one of a series of notches provided in said knob, and the knob having a depression opposite said notches over which the opposite side of said plate extends so that said opposite side can be depressed to elevate the tooth from a notch for adjustment of the plate to another position and then dropped into the notch corresponding to said latter position.

4. A control device comprising a control shaft, an operating knob for said shaft, an adjustment plate on said knob having on one side a tooth adapted to be received in any one of a series of notches provided in said knob, and the knob having a depression opposite said notches over which the opposite side of said plate extends so that said opposite side can be depressed to elevate the tooth from a notch for adjustment of the plate to another position and then dropped into the notch corresponding to said latter position, and screw fastening means holding said plate to said knob in any of its adjusted positions and arranged to loosen the plate for said tilting movement and for its movement to any of said positions.

5. A control device comprising a control shaft, an operating knob for said shaft having a circular recess provided with a series of notches on one side of its center and a well at the opposite side, a circular adjustment plate mounted in said recess having on its edge opposite said well an outwardly extending tooth arranged to be received in any one of said notches, the plate being tiltable into said well to elevate the tooth from any one of said notches so that the plate may be shifted axially to any position corresponding to said notches, whereupon the plate can be dropped to move the tooth into the notch corresponding to said position, and screw fastening means having threaded engagement with said knob and directed through elongated slots in said plate to provide for the release of the plate to permit said tilting movement and its movement to another position.

6. In a temperature control device for controlling the temperature of heating apparatus, a temperature control member adjustable to a series of temperature controlling positions, an adjustment member, a plate carried by said adjustment member having a driving connection with said member and also with said control member to move it to its controlling positions when said adjustment member is operated, a temperature scale cooperating with said adjustment member indicating positions of adjustment of said member, means for attaching said plate to said adjustment member in each of a plurality of angular positions having a predetermined relation to the positions of temperature adjustment indicated by said scale so as to calibrate said control device to the characteristics of said heating apparatus, and a reference point on said adjustment member serving initially to position said plate with reference to the adjustment member.

7. A temperature control device comprising a control shaft arranged to move to a series of temperature controlling positions, an operating knob for said shaft, a temperature scale cooperating with said knob indicating said positions of adjustment, an adjustment plate on said knob arranged to have a driving connection with said shaft and also having a tooth arranged to be fitted into any one of a series of notches in said knob, each notch having a width corresponding to a predetermined range of temperature control on said scale, a reference point on said knob opposite said series of notches for positioning the tooth initially, and indicating means on said knob denoting higher and lower temperature adjustments of the knob with reference to said shaft.

8. A temperature control device for controlling the temperature of heating apparatus comprising a temperature control member adjustable to a series of temperature controlling positions, a driving member, a plate carried by said driving member having a driving connection with it and also with said control member to move the control member to its controlling positions when the driving member is operated, a temperature scale indicating positions of adjustment of said driving member, and means for attaching said plate to said driving member in each of a plurality of angular positions having a predetermined temperature relationship to the positions of temperature adjustment indicated by said scale so as to calibrate said control device to the characteristics of said heating apparatus.

9. A temperature control device comprising a temperature control member adjustable to a series of temperature controlling positions, a driving member, an adjustment plate, a driving connection between said adjustment plate and said temperature control member and a driving connection between said adjustment plate and said driving member so that motion of the driving member is transmitted to said temperature control member whereby the latter is moved to its temperature controlling positions by operation of said driving member, a temperature scale indicating positions of adjustment of said driving member, and means for adjusting said plate with relation to said driving member in each of a plurality of angular positions having a predetermined temperature relationship to the positions of temperature adjustment indicated by said scale.

10. A temperature control device for controlling the temperature of heating apparatus comprising a temperature control member adjustable to a series of temperature controlling positions, a driving member, and adjustment plate, a driving connection between said adjustment plate and said temperature control member and a driving connection between said adjustment plate and said driving member so that movement of the driving member is transmitted to said temperature control member whereby the latter is moved to its temperature controlling positions by operation of said driving member, a temperature scale indicating positions of adjustment of said driving member, means for adjusting said plate with relation to said driving member in each of a plurality of angular positions having a predetermined temperature relation to the positions of temperature adjustment indicated by said scale so as to calibrate said control device to the characteristics of said heating apparatus, and a reference point cooperating with said adjustment plate for positioning said adjustment plate with reference to said driving member.

RAYMOND L. COULTRIP.

CERTIFICATE OF CORRECTION.

Patent No. 2,179,281.  November 7, 1939.

RAYMOND L. COULTRIP.

It is hereby certified that error appears in the printed specification of the above numbered patent requiring correction as follows: Page 3, first column, line 13, for "fo" read of; and second column, line 41, claim 3, after "knob" insert having; and that the said Letters Patent should be read with this correction therein that the same may conform to the record of the case in the Patent Office.

Signed and sealed this 19th day of December, A. D. 1939.

(Seal)

Henry Van Arsdale,
Acting Commissioner of Patents.